E. M. HEYLMAN.
DRIVE WHEEL MOUNTING.
APPLICATION FILED NOV. 2, 1914.
1,135,794. Patented Apr. 13, 1915.
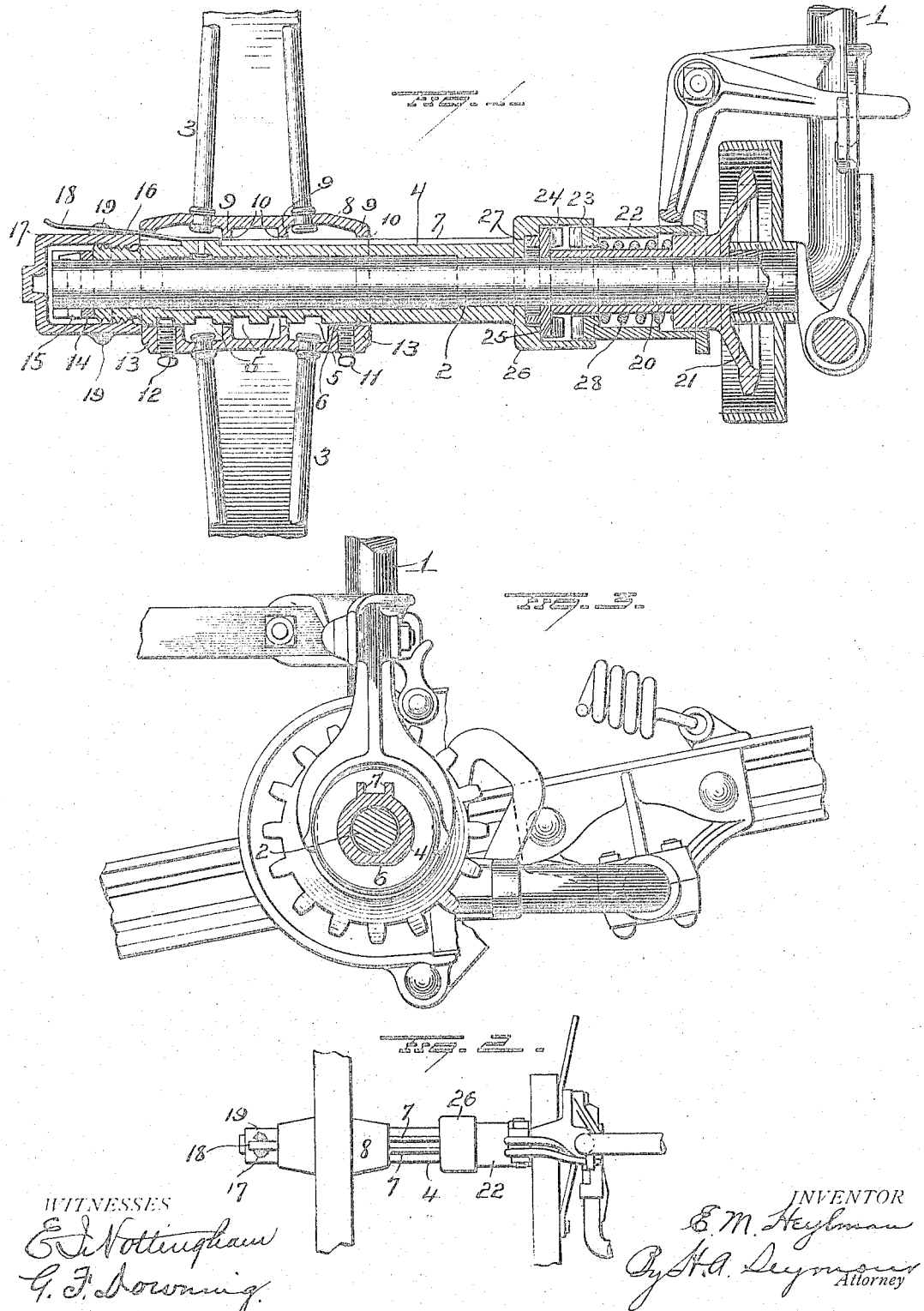

UNITED STATES PATENT OFFICE.

EDWARD M. HEYLMAN, OF SOUTH BEND, INDIANA, ASSIGNOR TO OLIVER CHILLED PLOW WORKS, OF SOUTH BEND, INDIANA.

DRIVE-WHEEL MOUNTING.

1,135,794. Specification of Letters Patent. Patented Apr. 13, 1915.

Original application filed July 3, 1914, Serial No. 848,827. Divided and this application filed November 2, 1914. Serial No. 869,922.

*To all whom it may concern:*

Be it known that I, EDWARD M. HEYLMAN, a citizen of the United States, and a resident of South Bend, in the county of St. Joseph and State of Indiana, have invented certain new and useful Improvements in Drive-Wheel Mountings; and I do hereby declare the following to be a full, clear, and exact description of the invention, such as will enable others skilled in the art to which it appertains to make and use the same.

This invention relates to improvements in drive wheel mountings, and more particularly to such as are adapted for use on listers,—this application being a division of application for patent filed by me on the third day of July 1914 and designated by Serial No. 848,827.

One object of my present invention is to provide simple and efficient means for mounting the drive wheel on the axle and for effecting lateral adjustment of said wheel.

A further object is to provide simple and efficient means for adjusting and securing the grease cups at the end of the axle.

With these and other objects in view, the invention consists in certain novel features of construction and combinations of parts as hereinafter set forth and pointed out in the claims.

In the accompanying drawings, Figure 1 is a longitudinal sectional view showing an embodiment of my invention; Fig. 2 is a plan view and Fig. 3 is a transverse section.

1 represents a portion of an arch axle and 2 a journal member of said axle which passes through the hub of a wheel 3.

A sleeve or axle box 4 is mounted freely upon the journal extension 2 of the arch axle and is provided with a plurality of notches 5 and with a flat exterior face at 6. Said sleeve or axle box is also provided with two longitudinally disposed parallel ribs 7. The hub 8 of the carrying wheel 3 is made with inwardly projecting flanges 9 having notches 10 for the accommodation of the parallel ribs 7 on the bearing sleeve or axle box 4, so as to cause the latter to rotate with the wheel. The wheel 3 may be moved laterally by moving the hub 8 on the axle box 4, and may be secured at any desired lateral adjustment by means of set screws 11, 12, passing through enlargements 13 at the ends of the hub. The set screw 11 engages the flat face 6 of the axle box while the set screw 12 engages in one of the notches 5.

A step washer 14 may be located on the axle member 2 at the end of the axle box and held in place by a linch pin 15 passing transversely through the axle member near the free end of the latter.

The axle box 4 is provided exteriorly with threads 16 in proximity to its outer end, for the accommodation of internal threads of a grease cup 17 which incloses the outer end of the axle member and axle box. In order to prevent this cap from turning a spring 18 is employed. This spring is secured to a flattened enlargement on the axle box between the parallel ribs or flanges 7 and is prevented from lateral displacement by the latter,—the free end portion of said spring projecting over the cap 17 and adapted to become disposed between cam lugs 19 on said cap. At least two pairs of such cam lugs should be provided and located diametrically opposite to each other, so that the cap may be turned a half revolution to force lubricant and then locked to prevent unscrewing.

The elongated sleeve or hub portion 20 of a sprocket wheel 21 is loosely mounted upon the journal member 2 of the arch axle and this sprocket is connected, by a suitable sprocket chain with mechanism to be driven.

Mounted slidably upon and rotatable with the extended hub or sleeve 20 of the sprocket wheel 21 is a clutch sleeve 22 having clutch teeth 23 at one end to engage teeth 24 on a removable ring 25 also loosely mounted on the axle member 2. The clutch ring 25 is inclosed within a casing 26 at the inner end of the bearing sleeve or axle box 4 and is provided with lugs 27 which engage said sleeve or axle box so as to rotate therewith, and the toothed outer end of the clutch sleeve also projects into said casing 26. The clutch members are pressed into interlocking engagement by the action of a spring 28 located between the sleeves 20 and 22 which rotate together and hence said spring will not be subjected to frictional engagement of a rotating part.

Having fully described my invention what I claim as new and desire to secure by Letters Patent, is:—

1. The combination with a spindle, of an axle box having a plurality of notches, a wheel hub adjustable on the axle box longitudinally thereof, a set screw passing through the wall of the hub and adapted to enter any one of said notches, and a longitudinal rib on the axle box, said hub being recessed to receive said longitudinal rib.

2. The combination with an axle, of an axle box rotatable on the axle, a wheel hub rotatable with and slidable on said axle box, said axle box having a plurality of notches and a flat face, and two set screws passing through the wall of the hub, one of said set screws engaging the flat face of the axle box and the other set screw entering one of the notches therein.

3. The combination with an axle, of an axle box rotatable thereon, said axle box having parallel longitudinal ribs, a wheel hub slidable on said axle box and having notches to receive said parallel ribs, and means carried by said hub and engaging the axle box diametrically opposite said ribs to secure the wheel hub at different adjustments on the axle box.

4. The combination with an axle, of an axle box rotatable thereon and having two longitudinal parallel ribs, a wheel hub mounted on said axle box and notched to receive said ribs, a lubricant cap screwed on the outer end of the axle box and having pairs of cam lugs thereon, and a spring secured to the axle box between the parallel ribs thereon and adapted to engage the lubricant cap between the cam lugs of any pair of said lugs.

In testimony whereof, I have signed this specification in the presence of two subscribing witnesses.

EDWARD M. HEYLMAN.

Witnesses:
EDWIN NICAR,
KATE E. BUCKLEY.